US009477397B2

(12) United States Patent
Nakazawa (10) Patent No.: US 9,477,397 B2
(45) Date of Patent: Oct. 25, 2016

(54) ELECTRONIC DEVICE

(75) Inventor: Ryota Nakazawa, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 4 days.

(21) Appl. No.: 13/482,718

(22) Filed: May 29, 2012

(65) Prior Publication Data

US 2012/0299855 A1    Nov. 29, 2012

(30) Foreign Application Priority Data

May 27, 2011    (JP) ................ 2011-118700

(51) Int. Cl.
*G06F 3/041* (2006.01)
*G06F 3/0488* (2013.01)

(52) U.S. Cl.
CPC .................. *G06F 3/0488* (2013.01)

(58) Field of Classification Search
CPC ................ G06F 3/041; G06F 3/0488
USPC ............................... 345/173–177
See application file for complete search history.

(56) References Cited

U.S. PATENT DOCUMENTS

| 7,847,789 | B2 * | 12/2010 | Kolmykov-Zotov |
| | | | et al. ............. 345/173 |
| 7,884,802 | B2 * | 2/2011 | Yoshioka ........... 345/169 |
| 8,624,859 | B2 | 1/2014 | Aono |
| 2006/0109252 | A1 | 5/2006 | Kolmykov-Zotov et al. |
| 2010/0100846 | A1 * | 4/2010 | Yoshida ............. 715/810 |
| 2010/0141606 | A1 * | 6/2010 | Bae et al. .......... 345/174 |
| 2011/0084910 | A1 * | 4/2011 | Almalki et al. ..... 345/173 |
| 2011/0181539 | A1 | 7/2011 | Aono |

FOREIGN PATENT DOCUMENTS

| JP | H06-44254 A | 2/1994 |
| JP | 2000-231670 A | 8/2000 |
| JP | 2006-039745 A | 2/2006 |
| JP | 2006-146936 A | 6/2006 |
| JP | 2006-285598 A | 10/2006 |
| JP | 2007-109082 A | 4/2007 |
| JP | 2010-096669 A | 4/2010 |
| JP | 2010-152736 A | 7/2010 |
| JP | 2011-081679 A | 4/2011 |

OTHER PUBLICATIONS

An Office Action; "Notice of Reasons for Rejection," issued by the Japanese Patent Office on Mar. 31, 2015, which corresponds to Japanese Patent Application No. 2012-121267 and is related to U.S. Appl. No. 13/482,718; with English language concise explanation.
JP Office Action dated Aug. 30, 2016 from corresponding JP Appl No. 2015-135116, 4 pp.

* cited by examiner

*Primary Examiner* — Andrew Sasinowski
(74) *Attorney, Agent, or Firm* — Studebaker & Brackett PC (57) ABSTRACT

A standard for performing an operation associated with an input object is changed in order to avoid an erroneous operation. When data based on the press detected by a press detection unit satisfies a predetermined standard, a control unit configured to perform the operation associated with the input object changes the predetermined standard of the input object based on a frequency of use of the operation associated with the input object.

7 Claims, 5 Drawing Sheets

ELECTRONIC DEVICE

CROSS REFERENCE TO RELATED APPLICATIONS

This application claims priority to and the benefit of Japanese Patent Application No. 2011-118700 filed on May 27, 2011, the entire contents of which are incorporated herein by reference.

FIELD

The embodiments discussed herein relate to an electronic device having a contact detection unit.

BACKGROUND

Lately, the electronic devices having the contact detection unit such as a touch sensor as a member for detecting an input operation by a user have been increasingly used for mobile terminals such as mobile phones. As a method used by a contact detection unit to detect the input operation, there are known variety of types, such as a resistive film type, a capacitive type, an optical type and the like. Those types detect a contact by a user's finger, a stylus pen and the like.

As the electronic device having the contact detection unit, a touch panel having the contact detection unit and a display unit laminated to each other has been known. In the touch panel, the display unit is disposed on a rear face of the contact detection unit and displays graphical images of operation keys and buttons (hereinafter, referred to as input objects). When the user presses the input object displayed on the display unit, the contact detection unit detects a contact at a pushed position. A technique to provide a tactile sensation to the user in response to pressing at a predetermined pressure load or higher has also been known.

Japanese Patent Laid-Open No. 2006-39745 discloses a touch panel type input apparatus which allows a multiple level selection by pressing operations.

Incidentally, when a plurality of input objects are arranged on the display unit, the user may inadvertently select an input object adjacent to a desired input object. In this case, an undesired operation starts and, if an important operation being performed is cancelled by the undesired operation, the important operation may not be recovered. Moreover, the user needs to perform an additional operation to cancel the undesired operation.

SUMMARY

An electronic device according to an embodiment includes a display unit configured to display a plurality of input objects, a contact detection unit configured to detect a contact, a press detection unit configured to detect a press on the contact detection unit, and a control unit, when the contact detection unit detects a contact at a position corresponding to the input object displayed on the display unit and the data based on the press detected by the press detection unit satisfies a predetermined standard, configured to perform an operation associated with the input object, wherein the control unit changes the predetermined standard of the input object based on a frequency of use of the operation associated with the input object.

DESCRIPTION OF EMBODIMENTS

An embodiment of the present invention (hereinafter, referred to simply as a present embodiment) will be described with reference to the accompanying drawings.

An embodiment discussed herein provides the electronic device which may change a standard for detecting a press for performing an operation associated with the input object, thereby preventing an erroneous operation.

According to the embodiment, when the data based on the press (press-based data) detected by the press detection unit satisfies the predetermined standard, the control unit configured to perform the operation associated with the input object changes the predetermined standard of the input object based on the frequency of use of the operation associated with the input object. Therefore, by setting the standards of the input object corresponding to a highly frequently used operation (an operation with a high frequency of use) to be low, for example, the highly frequently used operation is performed when the input object is lightly pressed down, and a less frequently used operation is performed when the input object corresponding thereto is pressed hard. Accordingly, the user is enabled to select the operation associated with the input object to be performed as the press-based data is changed. For example, even if the user, with an intention to contact the input object corresponding to the highly frequently used operation, simultaneously contacts the input object and another input object adjacent thereto, the less frequently used operation associated with the adjacent input object may be prevented from being performed. As a result, the operation intended by the user is performed, thereby offering convenience to the user.

According to the embodiment, the control unit arranges the input objects such that the input objects adjacent to each other have different predetermined standard. According to the embodiment, since the input objects adjacent to each other have different standards, a different press-based data is required for selecting each of the input objects adjacent to each other. Therefore, even if, for example, the user having an intention to contact the input object corresponding to the highly frequently used operation simultaneously contacts the input object and another input object adjacent thereto, the less frequently used operation associated with the adjacent input object is assuredly prevented from being performed. Thereby, the erroneous operation may be prevented.

The embodiment may provide the electronic device which enables to prevent the erroneous operation by changing the standards for performing the operations associated with the input objects.

(Configuration of the Embodiment)

Figure 1:
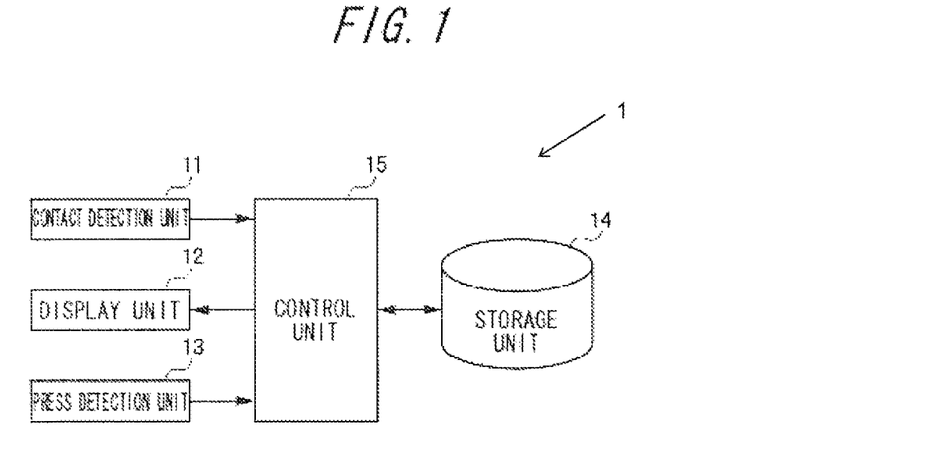
FIG. 1 is a block diagram illustrating a configuration of an electronic device according to an embodiment.

FIG. 1 is a block diagram illustrating a configuration of an electronic device according to the present embodiment. As illustrated in FIG. 1, an electronic device 1 according to the present embodiment includes a contact detection unit 11, a display unit 12, a press detection unit 13, a storage unit 14 and a control unit 15.

The contact detection unit 11 is normally disposed on a front face of the display unit 12 and, on an input face of the contact detection unit 11, detects a contact to and release from an input object displayed on the display unit 12 by a contact object such as a user's finger or a stylus pen. Also, the contact detection unit 11 detects a contact position on the input face and outputs the detected contact position to the control unit 15. The contact detection unit 11 may be, for example, a known type such as a resistive film type, a capacitive type, an optical type or the like. When the contact detection unit 11 is of the optical type, since the contact detection unit 11 detects a position where infrared rays are blocked by the contact object, the contact detection unit 11 does not need a physical contact of the contact object in order to detect a contact. That is, the contact detection unit 11 may also detect a contact other than the physical contact.

The display unit 12 displays graphical images of the input objects such as push-button switches. The push-button switches are buttons and keys used for an input operation by a user. The display unit 12 may be constituted by using, for example, a liquid crystal display (LCD) or an organic electroluminescence display (OELD).

The contact detection unit 11 and the display unit 12 may be integrally formed. Such a device having both functions of the contact detection unit 11 and the display unit 12 may have a configuration in which a plurality of photoelectric conversion elements such as photodiodes are orderly mixed in a group of pixel electrodes arranged in a matrix pattern in an LCD panel. This integrated device may display the image in a structure of the LCD panel and also detect the contact position by nearby photoelectric conversion elements that receive backlight of the liquid crystal display reflected by a tip of a pen in contact with a desired position on the face of the panel.

The press detection unit 13 detects a press on the input face of the contact detection unit 11. The press detection unit 13 is constituted by using, for example, a strain gauge sensor or a piezoelectric element and the like, which reacts to a press. If constituted by using a piezoelectric element, the electric property such as voltage (voltage value, or, press-based data hereafter) of the piezoelectric element of the press detection unit 13 changes along the magnitude of the load (force) applied to the press on the touch detect unit 11, or the change ratio (acceleration) of the load (force). The press detection unit 13 outputs the data based on the detected press (press-based data) on the input face to the control unit 15. The press detection unit 13 may be constituted according to a detection scheme of the contact detection unit 11. For the resistive film type, for example, the press detection unit may be constituted without using the strain gauge sensor if the press-based data may be detected from a change of an output signal based on a resistance change in accordance with a change of a contact area. For the capacitive type, alternatively, the press detection unit may be constituted without using the strain gauge sensor if the press-based data may be detected from the change of the output signal based on the magnitude of a capacitance (electrical charge) change in accordance with a change of a contact area. That is, the press detection unit 13 may also function as the contact detection unit 11 and as the control unit 15, since the press-based data is detected based on a change of the output signal from the contact detection unit 11. Or, the function of the press detection unit 13 may be substantialized by a combination of the contact detection unit 11 and the control unit 15.

The storage unit 14 may be constituted by using a semiconductor memory or the like and stores various input information and programs for operating the electronic device 1, as well as functioning as a work memory. According to the present embodiment, the storage unit 14 especially stores the standard set for each of the input objects and information about a frequency of use managed for each application.

The control unit 15 obtains the data based on the press detected by the press detection unit 13, by the press detection unit notifies the press-based data to the control unit 15, or by the control unit 15 detecting the data based on the press detected by the press detection unit 13. That is, the control unit 15 obtains from the press detection unit 13 the data based on the press on the contact detection unit 11. Incidentally, the press-based data may be, instead of voltage value, magnitude of the load applied to the press, current value, capacitance value, or the like. The control unit 15 has functions for, when the contact detection unit 11 detects a contact at a position corresponding to the input object displayed on the display unit 12 and the press-based data detected by the press detection unit 13 satisfies (or is on condition of satisfying) a predetermined standard, performing an operation associated with the input object and changing the predetermined standard of the input object based on the frequency of use of the operation associated with the input object. At this time, the control unit 15 may arrange the input objects such that the input objects adjacent to each other have different predetermined standards.

Here, "when the data based on the press detected by the press detection unit 13 satisfies the predetermined standard" may be, for example, by using the predetermined standard as a threshold, "when the data based on the press detected by the press detection unit 13 is equal to or over the threshold" or "when the data based on the press detected by the press detection unit 13 exceeds the threshold". Similarly, "when the data based on the press detected by the press detection unit 13 fails to satisfy the predetermined standard" may be, for example, by using the predetermined standard as the threshold, "when the data based on the press detected by the press detection unit 13 is equal to or smaller than the threshold", "when the data based on the press detected by the press detection unit 13 is below the threshold" or "when the data based on the press detected by the press detection unit 13 exceeds the threshold and then falls therebelow".

The standard of the input object according to the present embodiment will be described with reference to a graph in FIG. 2. In pressing operation of the input face of the contact detection unit 11, the user generally continues to increase a pressure on the input face upon touching the input unit until determining that the input operation is received. That is, the user presses down the input face. Here, for example, based on a change of a display of the display unit 12 or a tactile sensation provided to the contact object such as the user's finger or the like by a tactile sensation providing unit (not illustrated), the user determines that the input operation is received by the electronic device 1. When the user determines that the input operation is received, the user reduces the pressure on the input face. That is, the user performs a release operation by removing the finger from the input face.

Figure 2:
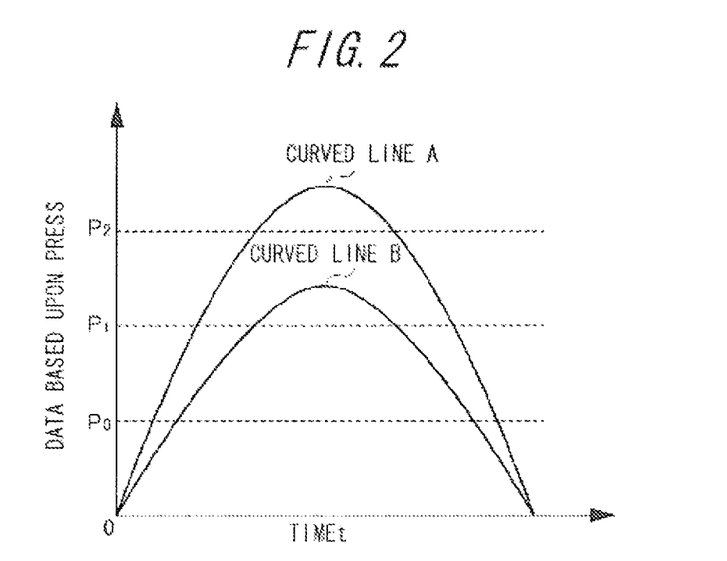
FIG. 2 is a graph schematically illustrating a press-based data in input object selection operation of the electronic device on a time axis according to the embodiment.

Accordingly, when the electronic device 1 performs an operation to change the display of the display unit 12, for example, when the press-based data satisfies a standard P2 in order to notify the user that the input operation is detected, the data based on the press detected by the press detection unit 13 follows a curved line A in FIG. 2. That is, the press-based data, with time, increases upward to the right exceeding a standard P1 and the standard P2 (standard P1<standard P2), reaches a maximum, and then decreases downward to the right passing the standard P2 and the standard P1 to become zero in the end. Similarly, when the electronic device 1 performs the operation to change the display of the display unit 12, for example, when the press-based data satisfies the standard P1 in order to notify the user of that the input operation is detected, the data based on the press detected by the press detection unit 13 follows a curved line B in FIG. 2. That is, the press-based data, with time, increases upward to the right exceeding the standard P1, reaches a maximum, and then decreases downward to the right passing the standard P1 to become zero in the end.

According to the present embodiment, prior to a standard setting process for the input object described below, a standard P0 is set for the input object displayed on the display unit 12. At this time, the standard P0 is set based on a normal pressure of a usual input operation to the display unit 12 by the user. Based on this setting, when a press-based data exceeding the standard P0 as the usual pressure of a predetermined input operation by the user is detected by the press detection unit 13, the control unit 15 determines that the input object displayed on the display unit 12 is pressed down.

Also, when data smaller than the standard P0 is detected based on the press on a pressed input object detected by the press detection unit 13, or when the release operation of the contact object such as the user's finger or the stylus pen is detected by the contact detection unit 11, the control unit 15 determines that the input operation pressing down the input object is ended (confirmed) and performs the operation associated with the input object. Since the standard P0 is set as described above, the operation associated with the input object is prevented from being performed in response to a slight contact to the input face of the contact detection unit 11 by the user. Thereby, an undesired operation may be prevented from being performed.

Next, based on a pressure heavier (stronger) than the normal pressure in the normal input operation to the input face of the contact detection unit 11 by the user, the standards P1, P2 (P1<P2) are set. The standards P1, P2 are used for selection of the operation to perform based on the pressure when the input objects adjacent to each other are simultaneously pressed down, and set based on the frequency of use of the operations (applications) associated with the input objects. Here, by comparing to a predetermined frequency threshold, the standard is set to be low for the input object corresponding to the operation with a higher frequency of use and to be high for the input object corresponding to the operation with a lower frequency of use. Thereby, the operation to be performed may be selected based on the press-based data when the adjacent input objects are simultaneously pressed down, which offers convenience to the user.

According to the present embodiment, when the adjacent input objects are simultaneously pressed down (touched), the standard is set for each of the input objects based on the operation (frequency of use) associated with the input object. Here, when the frequency of use of the operation associated with one of the input objects is higher than the predetermined frequency threshold, and the frequency of use of the operation associated with the other input object is lower than the predetermined frequency threshold, the standard P1 is set for the former input object, whereas the standard P2 is set for the latter input object, for example. When the data based on the press detected by the press detection unit 13 satisfies the standard P1 and fails to satisfy the standard P2 before the contact detection unit 11 detects release of the contact (no longer detects the contact), the control unit 15 performs the operation associated with the input object having the standard P1. When the data based on the press detected by the press detection unit 13 satisfies both of the standard P1 and the standard P2 and then the contact detection unit 11 detects release of the contact, the control unit 15 performs the operation associated with the input object having the standard P2.

As described above, when the adjacent input objects are simultaneously pressed down, one of the operations associated to the input objects may be performed based on the data based on the press detected by the press detection unit 13. When the data based on the press detected by the press detection unit 13 satisfies the standard P1 and fails to satisfy the standard P2, the control unit 15 may perform the operation associated with the input object having the standard P1. When the data based on the press detected by the press detection unit 13 satisfies both of the standard P1 and the standard P2, the control unit 15 may perform the operation associated with the input object having the standard P2.

(Operation of the Embodiment)

Figure 3:
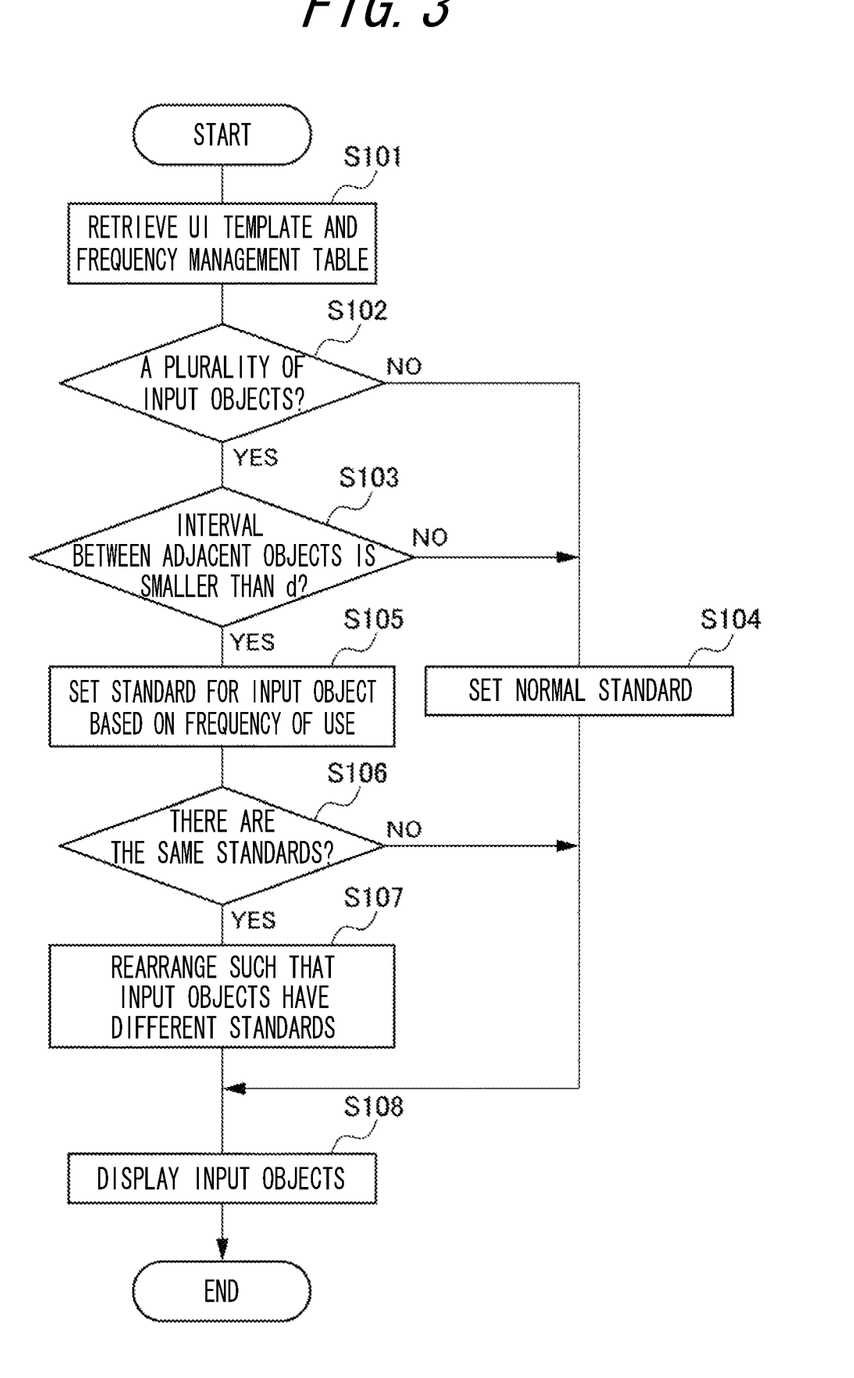
FIG. 3 is a flowchart illustrating a standard setting process of the electronic device according to the embodiment.
Figure 4:
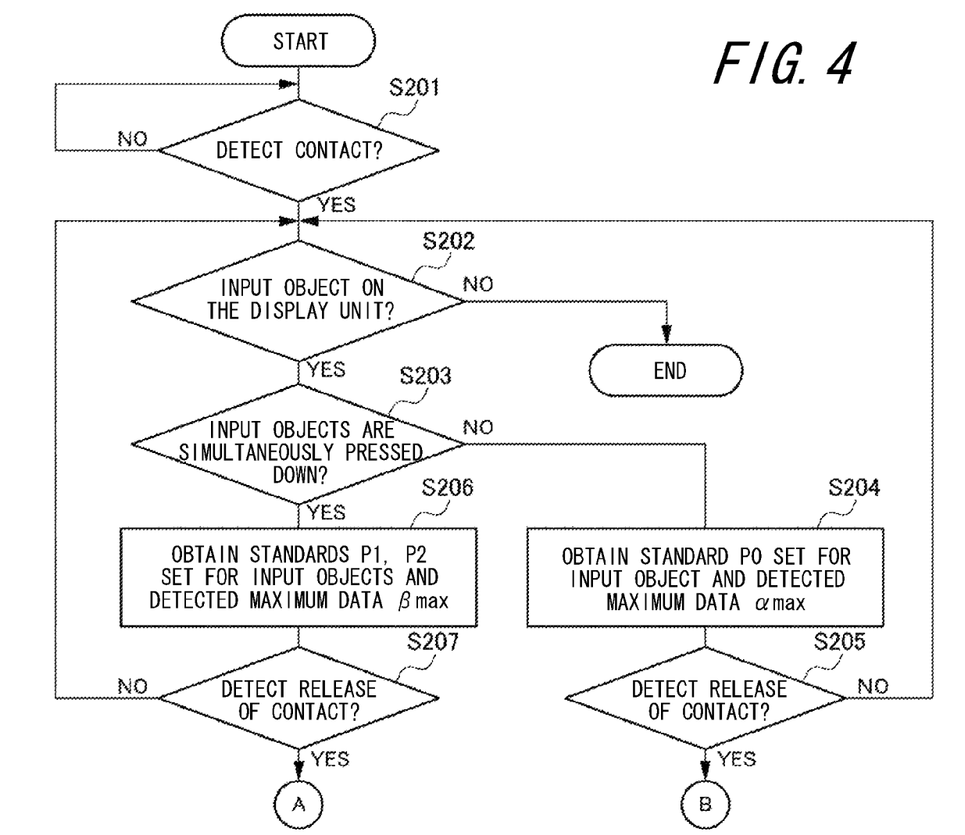
FIG. 4 is a flowchart illustrating an operation selecting process of the electronic device according to the embodiment.

FIG. 3 and FIG. 4 illustrate flowcharts of operations of the electronic device 1 according to the present embodiment. The standard setting process (FIG. 3) and an operation selecting process (FIG. 4 and FIG. 5) are illustrated. The operations of the electronic device 1 according to the present embodiment will be described below with reference to the flowcharts in FIG. 3 to FIG. 5.

First, the standard setting process for the input object according to the present embodiment will be described with reference to the flowchart in FIG. 3. Here, the standard setting process starts when the control unit 15 receives a command (request) for activating an application to display user interface including the input object on the display unit 12. The command is based on, for example, an operation of the electronic device 1 by the user. Upon reception of the command to activate the application for displaying the user interface, the control unit 15 retrieves a template corresponding to the command from templates of various user interface (UI) stored in the storage unit 14, and a frequency management table (step S101).

The frequency management table includes information about the frequencies of use of the operations of the applications such as the number of times to have performed the operation of each application and a necessary time for performing the operation. When the application is activated, the control unit 15 increments a counter assigned to each of the applications for managing the frequency of use of the application by one and monitors the time necessary for performing the operation (for example, a time between activation of the application and exiting the application) by setting a timer. That is, when the application is activated, the control unit 15 monitors the number of activation times and an accumulated operation (activation) time and updates the frequency management table assigned to a predetermined area (work memory) of the storage unit 14.

Next, the control unit 15 determines whether the retrieved UI template includes a plurality of input objects (step S102). When the retrieved UI template includes a plurality of input objects (YES at step S102), the control unit 15 determines whether the input objects adjacent to each other are to be arranged at intervals smaller than a predetermined interval d (step S103). The predetermined interval will be described below.

When the UI template includes a plurality of input objects and the input objects adjacent to each other are to be arranged at intervals smaller than the predetermined interval d (YES at step S103), the control unit 15 sets the standards for these input objects based on the frequencies of use of the operations (step S105). In setting the standard, the control unit 15, by referring to the retrieved frequency management table, compares the number of operation times of each application and the predetermined frequency threshold. When the number of operation times is equal to or larger than the frequency threshold, the control unit 15 sets the standard to be low (for example, the standard P1). When the number of operation times is smaller than the frequency threshold, the control unit 15 sets the standard higher than that when the number of operation times is equal to or larger than the frequency threshold (for example, the standard P2).

Figure 6:
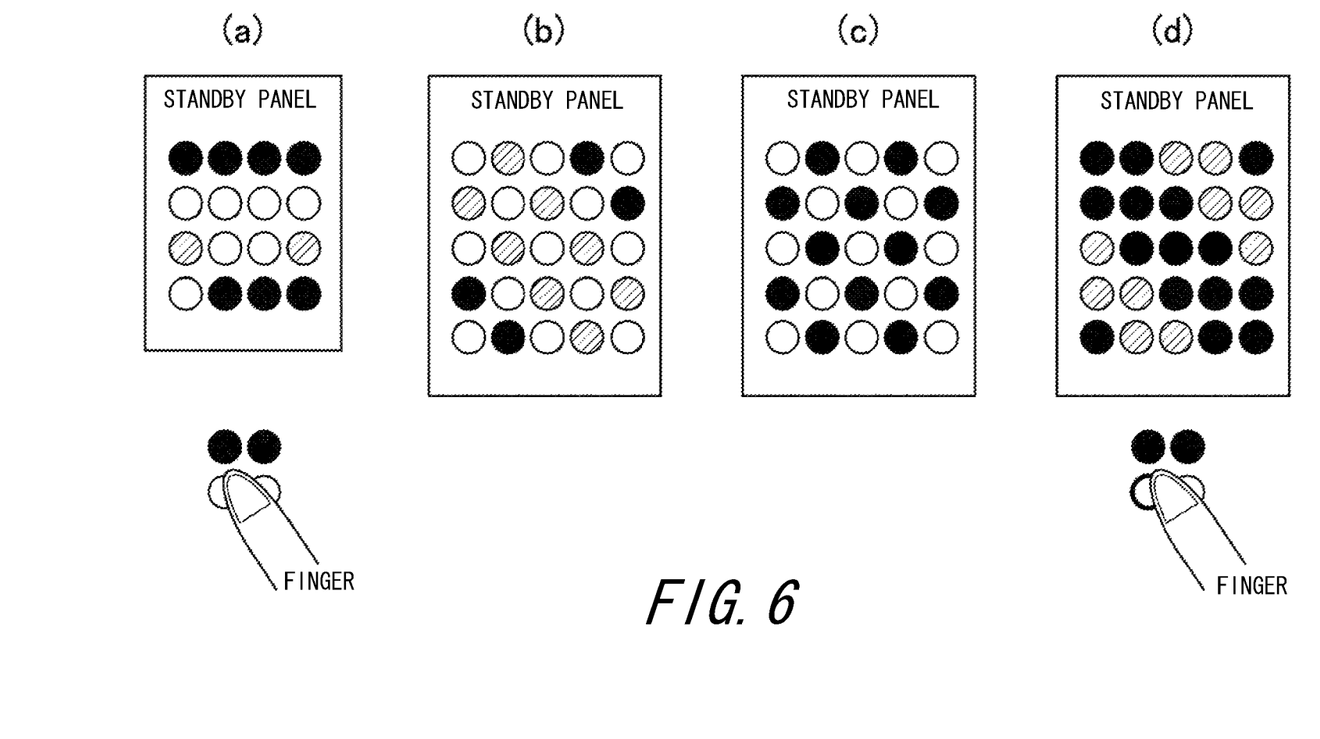
FIG. 6 is a schematic diagram illustrating arrangements of the input objects and the operation selecting process of the electronic device according to the embodiment.

Subsequently, the control unit 15 determines whether the input objects adjacent to each other have the same standard value (standard) (step S106). When the input objects have the same standard value (YES at step S106), the control unit 15 rearranges the input objects such that the standard values set thereto are different from each other (step S107). In rearranging the input objects, as illustrated in FIG. 6(b) and FIG. 6(c) described below, for example, the input objects may be classified into groups based on the standards set thereto and the input objects in different groups may be disposed alternately such that a different press-based data is required to each of the input objects adjacent to each other. Detailed description will be provided below.

When finishing setting of the standard described above, the control unit 15 displays each of the input objects on the display unit 12 to receive the input operation from the user (step S108). When it is determined in an "input object determination process" at step S102 that the retrieved UI template does not include a plurality of input objects (NO at step S102), that is, when there is one input object, the control unit 15 sets the normal standard (P0) to the input object (step S104) and then proceeds to an "input object display process" at step S108. Also, when it is determined in an "adjacent input object interval determination process" at step S103 that a plurality of input objects are arranged at intervals equal to or longer than the predetermined interval (NO at step S103), the control unit 15 sets the normal standard (P0) to each of the input objects (step S104) and then proceeds to the "input object display process" at step S108.

Thereby, when a plurality of input objects are arranged adjacent to each other, different standards are set for each of the input objects. The predetermined interval stated above is set as the predetermined interval d, such that, when the input objects are arranged at intervals shorter than the predetermined interval d, the user is likely to press down an undesired input object by mistake in the input operation. Here, the predetermined interval d may be a distance between edges of the input objects or a distance between centers of the input objects.

Figure 5:
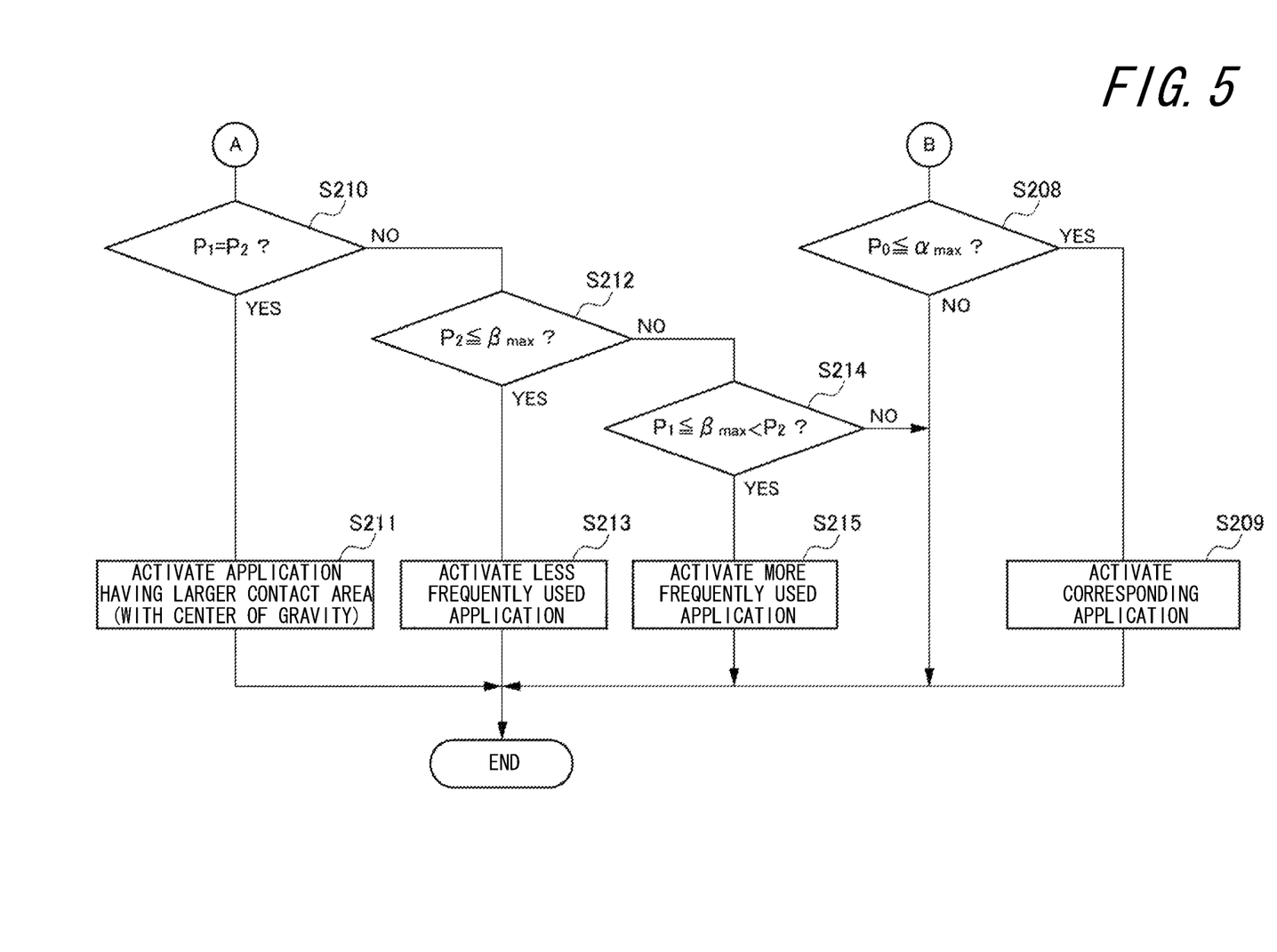
FIG. 5 is a flowchart illustrating a sequel to the operation selecting process in FIG. 4.

The following is a detailed description of the operation selection process of the input object by the electronic device 1 according to the present embodiment, with reference to the flowcharts in FIG. 4 and FIG. 5.

First, it is assumed that the display unit 12 is displaying a menu panel (standby panel) including a plurality of input objects. Here, when the user selects a desired input object by touching the input face of the contact detection unit 11, the contact detection unit 11 detects the contact and outputs position information about a coordinate in a contact area to the control unit 15. Alternatively, the control unit 15 may output position information about a coordinate of a center of the contact area (S201 in FIG. 4). The control unit 15 obtains the position information and determines whether there is the input object at a position on the display unit 12 corresponding to the contact area detected by the contact detection unit 11 (step S202). When it is determined that there is no input object at the position (NO at step S202), the operation selection process ends.

When it is determined that there is the input object at the position (YES at step S202), the control unit 15 determines, based on the input position information, whether a plurality of input objects are simultaneously pressed down (step S203). When it is determined that a plurality of input objects are not simultaneously pressed down (NO at step S203), the control unit 15 retrieves the standard of the input object from the storage unit 14 and obtains a maximum data αmax based on the press detected by the press detection unit 13 (step S204). Subsequently, when the contact detection unit 11 detects release of the contact (YES at step S205), the control unit 15 compares the normal standard P0 preliminarily obtained and the maximum press-based data αmax (S208 in FIG. 5).

When it is determined that the maximum press-based data αmax is equal to or larger than the normal standard P0 (YES at step S208), the control unit 15 activates the operation associated with the input object (a corresponding operation), that is, activates a corresponding application (step S209) and performs a desired operation. When it is determined that the maximum press-based data αmax is smaller than the normal standard P0 (NO at step S208), the control unit 15 considers the contact invalid leading to no further operations and ends a sequence of the input object operation selection process.

On the other hand, when it is determined in a "process to determine whether a plurality of input objects are simultaneously pressed down" at step S203 in FIG. 4 that a plurality of input objects are simultaneously pressed down based on the output of the contact detection unit 11 (YES at step S203), the control unit 15 determines that the adjacent input objects are simultaneously touched and retrieves the standards P1, P2 of each of the input objects from the storage unit 14, as well as obtaining a maximum data βmax based on the press detected by the press detection unit 13 (step S206).

Subsequently, when the user's finger moves away from the input face (releases) and the contact detection unit 11 detects release of the contact (YES at step S207), the control unit 15 compares the standards P1 and P2 preliminarily retrieved (step S210 in FIG. 5). When it is determined that the standard P1 and the standard P2 have the same value (YES at step S210), the control unit 15 determines that the application associated with the input object, having a larger contact area (size) (or having a center of the contact area) is effective and activates the corresponding application (step S211).

On the other hand, when it is determined at step S210 that the standard P1 and the standard P2 (P1<P2) have different values (standards) (NO at step S210), the control unit 15 compares the standard P2 and the maximum data βmax based on the press detected by the press detection unit 13 (step S212). When it is determined at step S212 that the maximum press-based data βmax is equal to or larger than the standard P2 (YES at step S212), the control unit 15 activates the operation associated with the input having the standard P2, that is, the control unit 15 activates the application with a lower frequency of use (step S213) and performs a desired operation.

On the other hand, when it is determined that the maximum press-based data βmax is smaller than the standard P2 (NO at step S212), the control unit 15 further compares the standard P1 and the maximum press-based data βmax (step S214). When it is determined that the maximum press-based data βmax is equal to or larger than the standard P1 and between the standard P1 and the standard P2 (YES at step S214), the control unit 15 performs the operation associated with the input object having the standard P1, that is, the control unit 15 activates the application with a higher frequency of use (step S215) and performs a desired operation. When it is determined that the maximum press-based data βmax is smaller than the normal standard P0 (NO at step S214), the control unit 15 considers the contact invalid leading to no further operations and ends the sequence of the input object operation selection process.

Although not illustrated in the figures, after an "application activation process" at S209, S211, S213 and S215, the control unit 15 monitors the number of activation times and the accumulated operation time of each of corresponding applications and updates the frequency management table stored in the storage unit 14.

According to the electronic device 1 of the present embodiment described above, when a contact to a plurality of input objects are detected and the standard of each of the input objects are at the same value, the control unit 15 performs the operation corresponding to the input object having the larger contact area (size) or the center of the contact area. However, it may also be possible to perform neither of the operations corresponding to the input objects, or to preferentially perform the operation corresponding to the input object which has been performed later.

According to the electronic device 1 of the present embodiment, also, the corresponding operation is performed at a timing when the contact detection unit 11 no longer detects the contact being detected after the press-based data satisfies the predetermined standard. However, the corresponding operation may be performed immediately after detection of the contact by the contact detection unit 11. In this case, however, when a contact across a plurality of input objects is detected and both of the standards P1, P2 (P1<P2) are satisfied, the operation of the input object having the standard P1 becomes ineffective. Alternatively, the operation corresponding to the input object may be performed when the press-based data fails to satisfy one predetermined standard after satisfying the other. Further, when the press-based data fails to satisfy the standard after satisfying the same standard, the control unit 15 may perform the operation corresponding to (associated with) the input object. In this case, for example, when the data based on the press detected by the press detection unit 13 satisfies the standard P1 and fails to satisfy the standard P2, the control unit 15 performs the operation associated with the input object having the standard P1 when the press-based data fails to satisfy the standard P1.

According to the electronic device 1 of the present embodiment, the standard setting process illustrated in FIG. 3 and the input object selection process illustrated in FIG. 4 and FIG. 5 are operated independently. However, the standard setting process may be included in the input object selection process. That is, the standard setting process may be performed prior to the operation selection process, or performed dynamically concurrently with the input object selection process.

FIG. 6 is a diagram schematically illustrating arrangements of the input objects and the operation for selecting process of the electronic device 1 according to the embodiment. In FIG. 6(a) to FIG. 6(d), each circle represents an input object. As the color of the circle is darker, a corresponding application is less frequently used and requires a stronger pressure.

According to the electronic device 1 of the present embodiment, as described above, an application is activated at a timing when the user releases contact to the corresponding input object displayed in the standby panel after touching the input object. Since a different standard is set based on the frequency of use of the application, the application with a higher frequency of use may be activated by a light contact and the application with a lower frequency of use may be activated by a strong contact. However, in the standby panel including a plurality of input objects illustrated in FIG. 6(a), when the input objects adjacent to each other have the same standard, the undesired input object may be selected by the user and a corresponding operation may be performed.

As illustrated in FIG. 6(b), therefore, by disposing the input objects in different standard groups alternately, a difference is generated between the standards of the input objects adjacent to each other, and thereby an erroneous operation may be prevented. As illustrated in FIG. 6(c), alternatively, by limiting the number of standard groups to two, the input objects adjacent to each other may have a significant difference in their standards. Thereby, convenience is offered to the user and the erroneous operation may be prevented.

As illustrated in FIG. 6(d), further, by making an input object transmit the light based on the frequency of use of the corresponding application, or by highlighting an outline of the input object when the press-based data satisfies the standard of the input object and activating a corresponding application when the finger is released, visibility of the user may be increased. The same effect may be obtained by adding, to the configuration of the electronic device 1 illustrated in FIG. 1, the tactile sensation providing unit configured to detect a predetermined press-based data and, in response, to provide the tactile sensation to the user by vibration.

(Effect of the Embodiment)

According to the electronic device 1 of the present embodiment, as described above, when the data based on the press detected by the press detection unit 13 satisfies (or on condition of satisfying) the predetermined standard, the control unit 15 configured to perform the operation associated with the input object varies the standard of the input object based on the frequency of use of the operation associated with the input object. Therefore, for example, by setting the standard of the input object associated with the operation with the high frequency of use to be low, the corresponding operation is performed when the input object is lightly pressed down, whereas the operation with the low frequency of use is performed when the input object corresponding thereto is strongly pressed down. Accordingly, the operation associated with the input object to be performed may be selected based on the press-based data and thus, when a contact across the input objects adjacent to each other is detected, the erroneous operation to select the undesired input object by mistake may be prevented. As a result, an operation desired by the user may be selected, thus offering convenience to the user.

According to the electronic device 1 of the present embodiment, further, the control unit 15 arranges the input objects having different standards adjacent to each other. Thereby, different standards are required to select the input objects adjacent to each other and, when the user simultaneously contacts these input objects, selection of the undesired input object may be prevented. Further, since the outline of the input object is highlighted when the press-based data satisfies the standard of the input object, or since the tactile sensation as vibration is provided to the user in response to detection of the predetermined press-based data, the user may be notified of a level of the press-based data. Thus, convenience is offered to the user.

Although a preferred embodiment is described above, it is to be understood that the scope of the present invention is not limited thereto. It will be understood by a person who is ordinarily skilled in the art that the above embodiment may be changed or altered in a variety of manners. Such changes and alterations are also included in the scope of the present invention, as is clear from the Claims attached hereto.

According to the present embodiment, when the adjacent input objects are simultaneously pressed down (touched), the standards P1 and P2 are used, otherwise the standard P0 is used. However, the present invention is not limited thereto but it is not necessary to change the standards to be used between when the adjacent input objects are simultaneously pressed down and when one input object is pressed down.

According to an embodiment, in proportion to the frequency of use of the operation associated with the input object, that is, as the number of usage (activation) is more increased, the standard of the input object may be set to be lower. According to an embodiment, alternatively, in proportion to the frequency of use of the operation associated with the input object, the standard of another input object may be set to be higher.

According to an embodiment, also, when the adjacent input objects are simultaneously pressed down and the operation associated with one of the input objects has a higher frequency of use than that of the operation associated with the other input object, the standard of the former input object may be set to be lower than that of the latter input object.

According to the present embodiment, moreover, when the adjacent input objects are arranged at an interval smaller than the predetermined interval (including when the input objects are disposed side by side), the standard is set for the input objects based on the frequency of use of the operation. However, the present invention is not limited thereto but, when the adjacent input objects are disposed at the predetermined interval or longer, the standard may be set for the input objects based on the frequency of use of the operations. According to an embodiment, that is, the standard may be set for the input object based on the frequency of use of the operation independently of the interval between the input objects adjacent to each other.

According to an embodiment, further, when the adjacent input objects have the same standard, the input objects are rearranged such that the input objects adjacent to each other have different standards. Here, such a rearrangement includes arrangement of the input objects at the predetermined interval or longer.

What is claimed is:

1. An electronic device comprising:
   a display unit configured to display a plurality of input objects;
   a contact detection unit configured to detect a contact of a contact object on the display unit, respective one of the input objects having a predetermined standard of force required to detect a press on the contact detection unit for activating an application associated with the respective one of the input objects;
   a press detection unit configured to detect a press on the contact detection unit by a pressing operation of the contact object on the display unit; and
   a control unit configured to detect that a contact of the contact object on the display unit at a position corresponding to one of the input objects to select the one of the input objects displayed on the display unit is detected by the contact detection unit and that data based on the press on the contact detection unit by the pressing operation of the contact object on the display unit at the position corresponding to the one of the input objects detected by the press detection unit satisfies the predetermined standard of the one of the input objects, and then to activate the application associated with the one of input objects, the control unit being configured to differentiate the predetermined standard of the one of the input objects from the predetermined standard of an input object adjacent to the one of the input objects based on a frequency of use of the application associated with the one of the input objects.

2. The electronic device according to claim 1, wherein the control unit arranges the plurality of input objects such that the adjacent input objects have the predetermined standards which are different from each other based on the frequency of use of the applications associated with the input objects.

3. The electronic device according to claim 1, wherein the predetermined standard of a first input object is lower than the predetermined standard of a second input object of which the operation is less frequently used than the application of the first input object.

4. An electronic device, comprising:
   a display unit configured to display a plurality of input objects;
   a contact detection unit configured to detect a contact on the display unit;
   a press detection unit configured to detect a press on the contact detection unit; and
   a control unit configured to detect that a contact on the display unit to select one of the input objects displayed on the display unit is detected, at a position corresponding to the one of the input objects, by the contact detection unit and that data based on the press on the display unit detected by the press detection unit satisfies a predetermined standard of force required to press on the contact detection unit, and then to activate an application associated with the input object, the control unit changing the predetermined standard of the force required of pressing the one input object based on a frequency of use of the application associated with the one input object,
   wherein the control unit changes the predetermined standard of the force required of pressing the one input object, further based on comparison between the predetermined standard for the one input object and the predetermined standard for an adjacent input object to the one input object.

5. An electronic device, comprising:
   a display unit configured to display a plurality of input objects;
   a contact detection unit configured to detect a contact on the display unit;
   a press detection unit configured to detect a press on the contact detection unit; and
   a control unit configured to detect that a contact on the display unit to select one of the input objects displayed on the display unit is detected, at a position corresponding to the one of the input objects, by the contact detection unit and that data based on the press on the display unit detected by the press detection unit satisfies a predetermined standard of force required to press on the contact detection unit, and then to activate an application associated with the input object, the control unit changing the predetermined standard of the force required of pressing the one input object based on a frequency of use of the application associated with the one input object, wherein when it is detected that adjacent input objects are simultaneously pressed, the control unit determines one of the adjacent input objects to be selected based on the data based on the press on the display unit and the frequency of use.

6. An electronic device, comprising:

a display unit configured to display a plurality of input objects;

a contact detection unit configured to detect a contact on the display unit;

a press detection unit configured to detect a press on the contact detection unit; and a control unit configured to detect that a contact on the display unit to select one of the input objects displayed on the display unit is detected, at a position corresponding to the one of the input objects, by the contact detection unit and that data based on the press on the display unit detected by the press detection unit satisfies a predetermined standard of force required to press on the contact detection unit, and then to activate an application associated with the input object, wherein the control unit is configured to determine whether the input objects adjacent to each other are to be arranged at intervals smaller than a predetermined interval, and when it is determined that the input objects adjacent to each other are to be arranged at intervals smaller than the predetermined interval, the control unit changes the predetermined standard of the force required of pressing the one input object based on a frequency of use of the application associated with the one input object.

7. An electronic device, comprising:

a display unit configured to display a plurality of input objects;

a contact detection unit configured to detect a contact on the display unit;

a press detection unit configured to detect a press on the contact detection unit; and a control unit configured to detect that a contact on the display unit to select one of the input objects displayed on the display unit is detected, at a position corresponding to the one of the input objects, by the contact detection unit and that data based on the press on the display unit detected by the press detection unit satisfies a predetermined standard of force required to press on the contact detection unit, and then to activate an application associated with the input object, the control unit changing the predetermined standard of the force required of pressing the one input object based on a frequency of use of the application associated with the one input object, wherein the control unit determines the predetermined standards of adjacent input objects to be different from each other based on a distance between the adjacent input objects as well as frequency of the use of the applications associated with the adjacent input objects.

* * * * *